Figure 1:
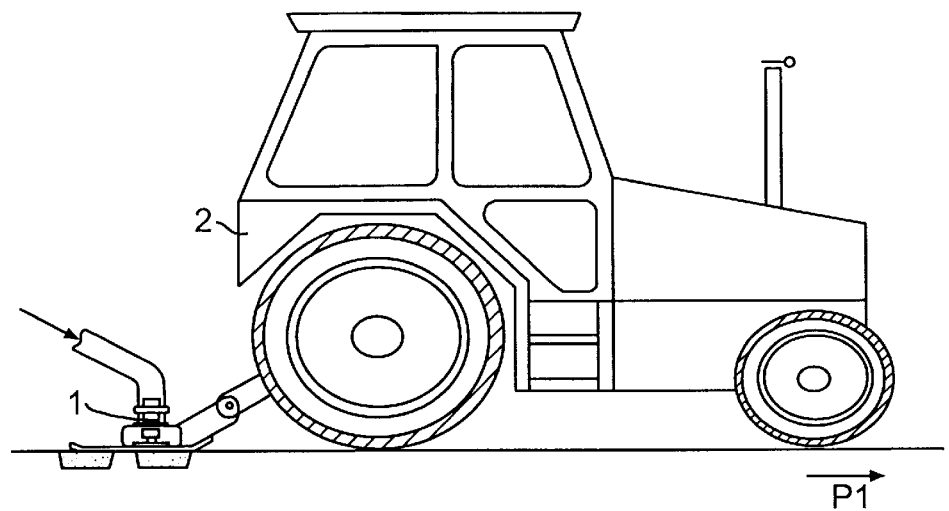

United States Patent [19]
Hatlø

[11] Patent Number: 6,142,084
[45] Date of Patent: *Nov. 7, 2000

[54] METHOD AND DEVICE FOR PERIODIC DEPOSITING OF LIQUID MANURE SUCH AS SLURRY IN A SOIL

[76] Inventor: Jan Kare Hatlø, Nyvegen 4, N-6052, Giske, Norway

[ * ] Notice: This patent issued on a continued prosecution application filed under 37 CFR 1.53(d), and is subject to the twenty year patent term provisions of 35 U.S.C. 154(a)(2).

[21] Appl. No.: 09/125,282
[22] PCT Filed: Feb. 14, 1997
[86] PCT No.: PCT/NO97/00049
  § 371 Date: Feb. 5, 1999
  § 102(e) Date: Feb. 5, 1999
[87] PCT Pub. No.: WO97/29626
  PCT Pub. Date: Aug. 21, 1997

[30] Foreign Application Priority Data

Feb. 16, 1996 [NO] Norway ..................................... 960623

[51] Int. Cl.$^7$ .................................................. A01C 23/00
[52] U.S. Cl. .............................. 111/127; 239/99; 239/100
[58] Field of Search ..................................... 111/127, 128, 111/129, 118, 901; 172/4.5; 239/99, 100

[56] References Cited

U.S. PATENT DOCUMENTS

| | | |
|---|---|---|
| 2,988,025 | 6/1961 | Johnston . |
| 3,252,249 | 5/1966 | Propst ................................. 111/127 X |
| 3,353,752 | 11/1967 | Ranhagen et al. ..................... 239/99 X |
| 3,435,785 | 4/1969 | Harbolt . |
| 3,815,525 | 6/1974 | Kainson et al. ......................... 111/127 |
| 3,920,185 | 11/1975 | Kwok ......................................... 239/99 |
| 4,009,666 | 3/1977 | Russell et al. .......................... 111/127 |
| 4,624,193 | 11/1986 | Johnston . |
| 4,834,288 | 5/1989 | Kenny et al. .............................. 239/99 |
| 4,907,516 | 3/1990 | Rogers . |

FOREIGN PATENT DOCUMENTS

| | | | |
|---|---|---|---|
| 383633 | 8/1990 | European Pat. Off. ............... | 111/127 |
| 0 430 347 A1 | 6/1991 | European Pat. Off. . | |
| 9001983 | 4/1992 | Netherlands .......................... | 111/127 |
| 169811 | 5/1992 | Norway . | |
| 574183 | 9/1977 | U.S.S.R. ................................. | 111/127 |

*Primary Examiner*—Victor Batson
*Attorney, Agent, or Firm*—Finnegan, Henderson, Farabow, Garrett & Dunner

[57] ABSTRACT

In a method for periodic depositing of liquid manure such as a slurry in a soil (80) the slurry is injected in a concentrated jet (9) under pressure with the result that forms and fills a groove (6) in the soil, which groove (6) is preferably closed after the injection. A device (1) for use in the method comprises at least one nozzle (5) with a breaker element (10) for periodic interruption of or opening for an injection jet (9) in an outlet direction (P$_2$), the nozzle preferably being provided as an opening from a chamber (3, 29, 35, 38, 52, 72) pressurized with slurry. The breaker element (10) may be rotatably mounted about a rotation axis (22) which is parallel to the nozzle's outlet direction (P$_2$), and is located beside the nozzle (5), with the result that during a rotational movement of the breaker element periodically interrupts the injection jet (9).

9 Claims, 4 Drawing Sheets

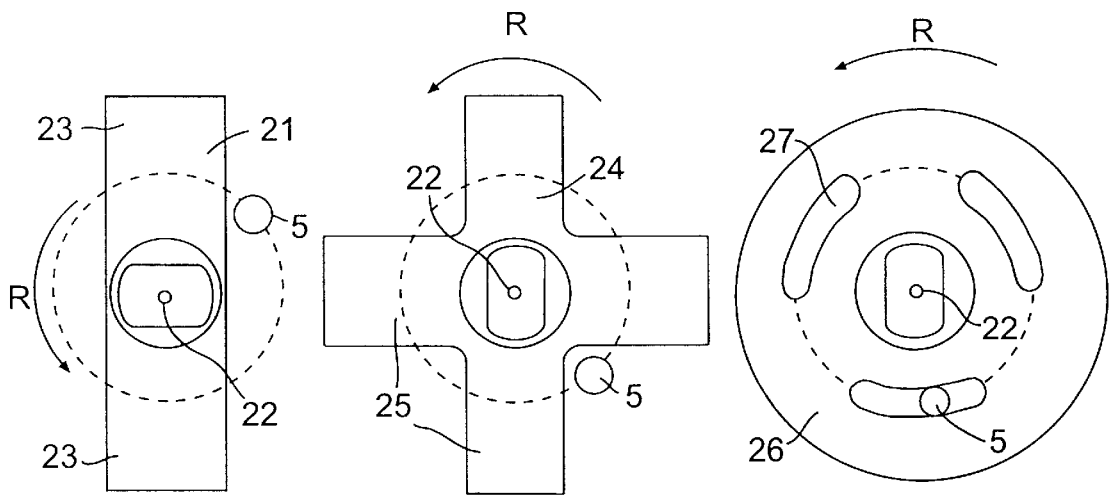
FIG. 5A  FIG. 5B  FIG. 5C
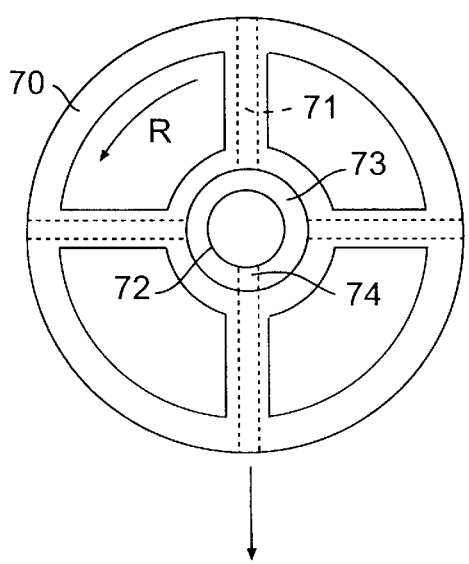
FIG. 6A
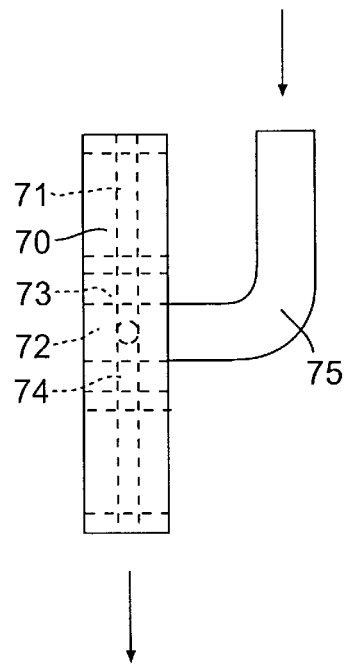
FIG. 6B

METHOD AND DEVICE FOR PERIODIC DEPOSITING OF LIQUID MANURE SUCH AS SLURRY IN A SOIL

The invention concerns a device for periodic injection of liquid manure in a concentrated jet in a soil, wherein the device is adapted to be supplied with pressurized liquid manure from a pump or container.

Liquid manuere, i.e. a mixture of animal manure, urine and water, is used in agriculture for fertilizing soils.

The simplest method of spreading liquid manure, such as slurry, is to spray it or pour it over the soil. This leads to substantial evaporation of components in the liquid manure, odour problems and often also run-off problems, especially in sloping terrain.

In order to reduce the problems associated with evaporation, odour and run-off, while at the same time increasing the soil's absorption of the nutrients in the liquid manure, it is advantageous to place the liquid manure in grooves which are preferably closed afterwords.

U.S. Pat. No. 4,907,516 discloses a method for periodic depositing of liquid manure in a soil, performed by a device pulled behind a vehicle to which pressurised liquid manure is supplied from a pump, whereby the liquid manure is injected in a concentrated jet under pressure, with the result that the liquid manure forms and fills a groove in the soil.

U.S. Pat. No. 4,624,193 discloses a method and an apparatus for the jet injection of agricultural liquids into the soil, in which a series of jet nozzles, one for each plant row, is spaced along the usual tool bar carried by a tractor. A timing distributor connects high pressure liquid successively to the nozzles to inject a high velocity slug of liquid which will penetrate the soil to an agronomically satisfactory depth.

The object of the invention is to provide an improved device for depositing liquid manure in a soil, where evaporation, run-off and odour problems are avoided, and where the device ensures an even and problem-free injection of the liquid manure in the soil.

The object is achieved according to the invention with a device of the type mentioned in the introduction, characterized by the features which are indicated in claim 1.

Figure 2:
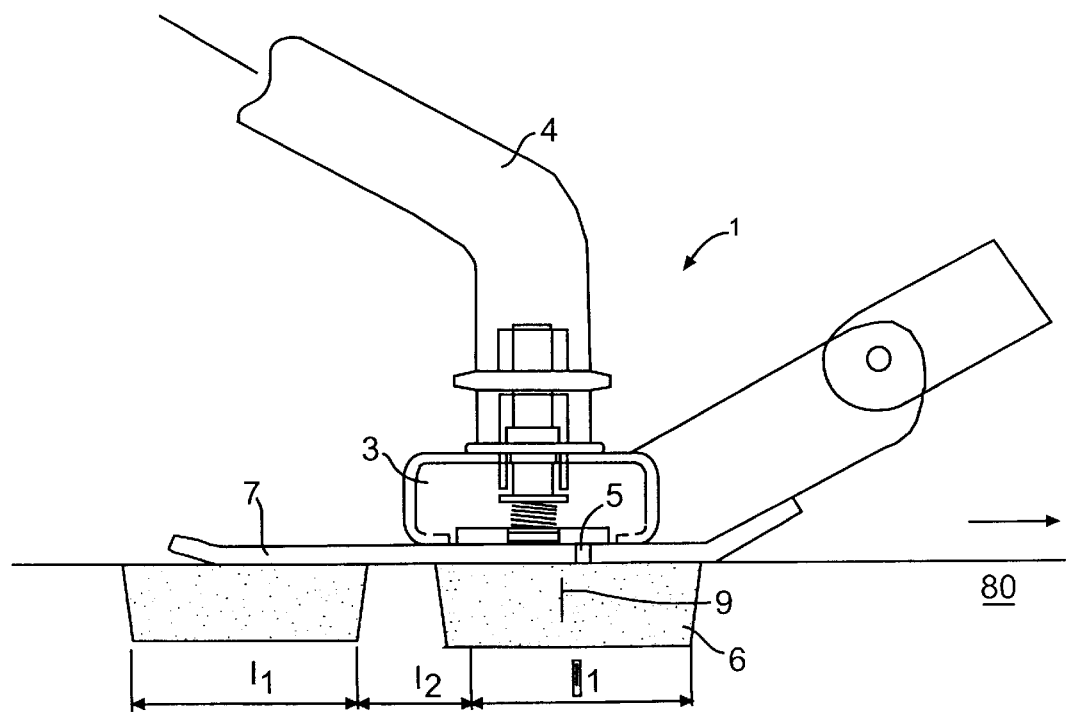
Figure 3:
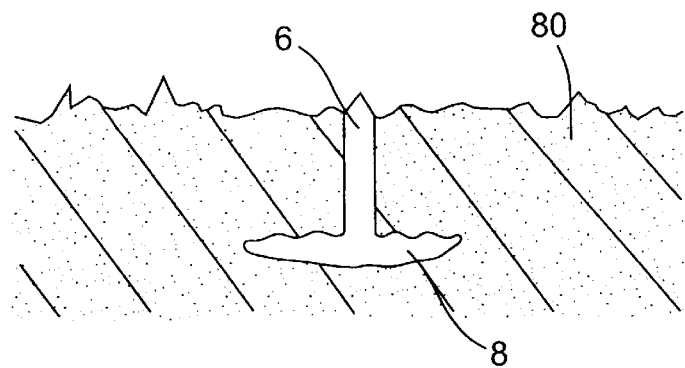
Figure 4:
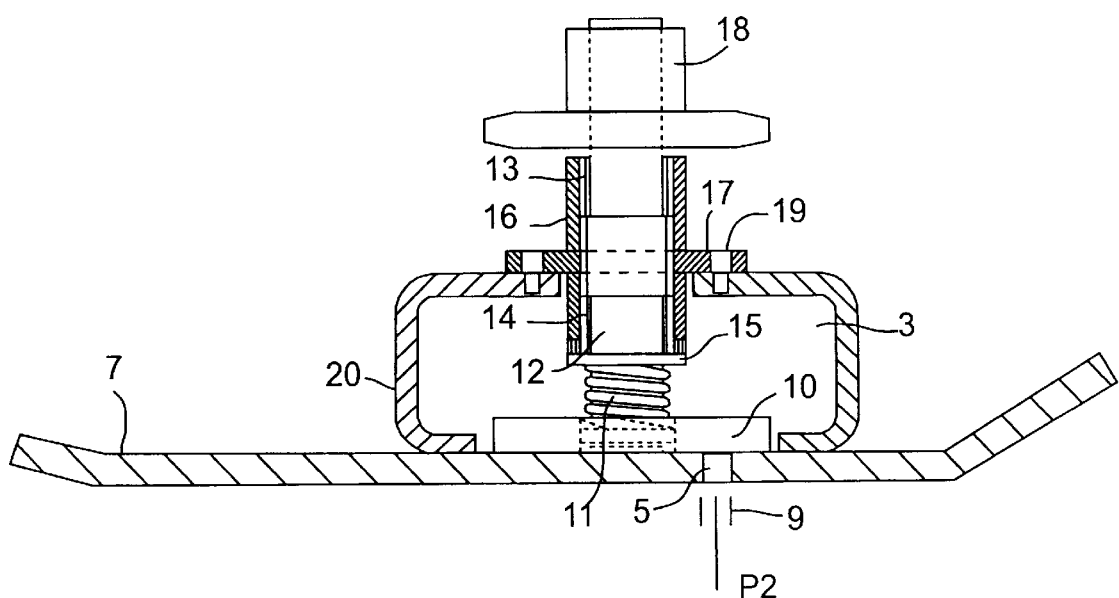
Figure 7A:
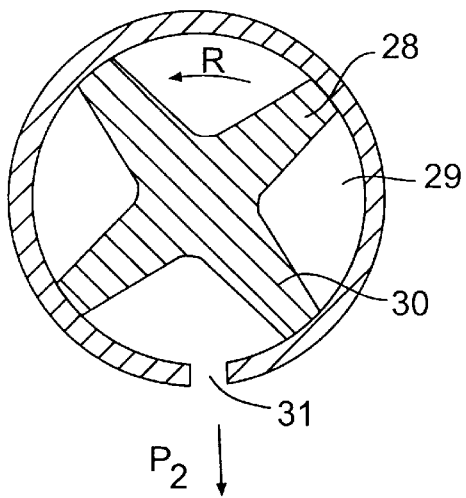
Figure 8:
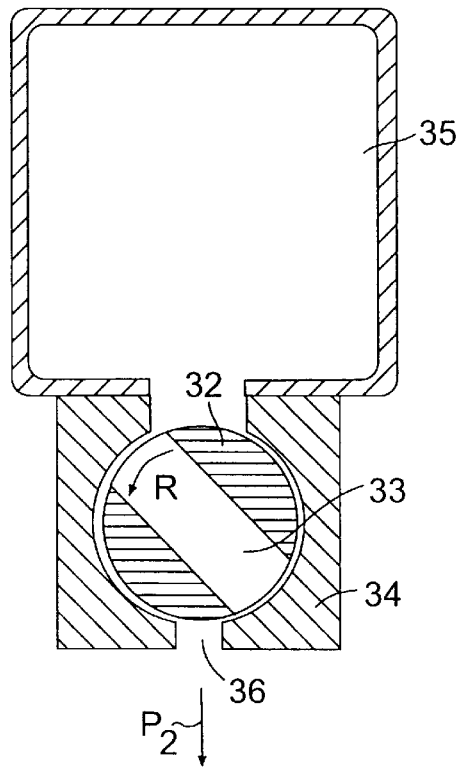

The invention will now be explained in more detail in connection with the description of several embodiments, and with reference to the drawing, in which FIG. 1 illustrates a tractor pulling an injection device according to the invention, FIG. 2 illustrates the injection device, partially in a longitudinal section made in the tractor's direction of movement, and a groove which is formed by the injection device, FIG. 3 is a cross section of the groove in FIG. 2, where the section is made across the tractor's direction of movement, FIG. 4 is a longitudinal section of a preferred embodiment of the injection device according to the invention, FIGS. 5a, b and c illustrate different designs of a breaker element for use together with the injection device illustrated in FIG. 4, FIGS. 6a and 6b are front and side views, respectively, illustrating an alternative injection device, FIGS. 7a and b illustrate designs of alternative breaker elements, FIG. 8 illustrates a second alternative design of a breaker element.

FIG. 1 illustrates a tractor 2 pulling an injection device 1 according to the invention in a direction of movement indicated by the arrow $P_1$. The injection device forms part of an agricultural tool which is preferably composed of several injection devices, a tank for liquid manure, one or more pumps for pressurizing the liquid manure, pipes or hoses for the supply of liquid manure to the injection devices and the necessary supporting and securing elements. With the exception of the injection device all of these elements are known, and will not be described in more detail.

FIG. 2 illustrates the injection device in closer detail. A pressure chamber 3 is supplied with liquid manure through a supply pipe 4. The pressure chamber is arranged on top of a shoe 7 which is dragged along a soil 80 by the tractor.

A nozzle 5 provided in an opening in the shoe 7 generates a concentrated jet 9 of liquid manure directed towards the soil 80. The jet is interrupted periodically, thus forming a discontinuous groove 6 in the soil.

The groove 6 is shown in a longitudinal section, i.e. a section formed in the ractor's and the injection device's direction of movement. The injection and the formation of the groove 6 are performed over a length $l_1$, whereupon the injection is interrupted over a length $l_2$. The object of the interrupted injection is to prevent run-off in sloping terrain. Tests have shown that the length $l_1$ should be between 15 and 20 cm, and $l_2$ approximately 5 cm, but the optimum sizes for $l_1$ and $l_2$ can of course vary depending on the amount of liquid manure which is injected, the soil and the slope of the terrain. The lengths $l_1$ and $l_2$ are preferably obtained by a synchronization of the vehicle's speed and the periodic injection.

FIG. 3 shows a section of the groove 6 in FIG. 2, made across the direction of movement. A pocket 8 can be seen here which is formed by the jet 9. The size and shape of the pocket 8 will depend on the soil, the speed of the jet and the volume of flow, but generally an injection groove will be formed with a relatively narrow upper section and an extended pocket where the liquid manure is mixed with earth. This shape of groove is very advantageous, since it reduces evaporation and odour problems.

FIG. 4 shows the injection device in closer detail. It can be seen here how the pressure chamber 3 in the form of a square pipe 20 is arranged on top of the shoe 7, and further how the nozzle 5 is arranged as an opening from the pressure chamber 3, through the shoe 7, thus enabling it to produce the jet 9 in an outlet direction indicated by the arrow $P_2$. A rotating breaker element 10 interrupts the jet 9 at regular intervals, thus causing it to form the discontinuous groove. The breaker element's 10 rotational movement is generated by a rotating drive shaft 12 which is provided inside a bearing sleeve 16 and receives its rotational movement from a chain wheel 18. The chain wheel 18 is preferably driven by a chain drive which receives its movement from a hydraulic motor, which in turn is driven by hydraulic oil from a hydraulic pump in the tractor. The drive shaft 12 will, however, be able to be operated in a number of known ways, and since this falls outside the scope of the invention, it will not be described further.

The bearing sleeve 16 is attached by means of a sleeve flange 17 and fixing screws 19 to the pressure chamber 3, and the bearing sleeve is further provided with an upper slide bearing 13 and a lower slide bearing 14 for mounting the drive shaft 12. A compression spring 11 is provided between a bearing disc 15 and the breaker element 10, and apart from ensuring that the breaker element 10 is always forced into sealing abutment against the shoe 7, the spring 11 also compensates for wear of the breaker element.

The shoe 7 is dragged along the soil, thus ensuring that the nozzle 5 is kept at an approximately constant height above the soil. The shoe prevents the liquid manure from splashing and concomitant evaporation during the injection. At the same time the shoe effects a closing of the groove after the injection. A shoe with a flat bottom will normally provide adequate closing of the groove, but the closing function may be improved by providing one or more cutting edges or ridges (not shown) in the bottom of the shoe or possibly separately behind the shoe.

A plurality of injection devices may be assembled to form an agricultural tool (not shown) by giving the square pipe 3 an extension across the tractor's direction of movement, the square pipe thus forming a foundation and pressure chamber for affixing several shoes 7 with nozzles 5.

FIGS. 5a, b and c illustrate three different embodiments of the rotating breaker element 10 which is attached to the drive shaft 12, thus enabling it to rotate about an axis 22 as indicated by the arrows R. FIG. 5a illustrates a breaker element consisting of a rectangular plate 21 with two wings 23 which, during the rotation of the plate 21, pass and close off the nozzle 5, which provides a periodic interruption of the injection jet. FIG. 5b illustrates a design where the breaker element consists of a cross 24 with four wings 25. This design is preferred in relation to the design in FIG. 5a, since it produces the same interruption frequency as the breaker element in FIG. 5a at half the rotational speed, which means reduced wear on the rotating parts. FIG. 5c illustrates a breaker element in the form of a disc 26 with three openings 27. During the rotation of the disc the openings 27 are brought into correspondence with the nozzle 5, thus enabling the injection jet to pass. Compared with the designs illustrated in FIGS. 5a and b the design illustrated in FIG. 5c has the advantage of providing better sealing against the shoe 7.

FIG. 6 shows an alternative design of the injection device. Here a wheel 70 with a hollow hub 73 is dragged behind a vehicle. The hub 73 is stationary, while the wheel 70 is caused to rotate by the movement of the wheel in relation to the soil, indicated by the arrow R. A pressure chamber 72 which is located in the hub's 73 cavity is supplied with liquid manure from a supply pipe 75, and a downwardly directed nozzle 74 in the hub 73 is brought by means of the wheel's rotation into correspondence with radial openings 71 which extend from the hub 73 to the circumference of the wheel 70. Every time one of the radial openings 71 is located at the bottom of the wheel, in correspondence with the nozzle 74, a jet is thereby injected into the soil.

Figure 7B:
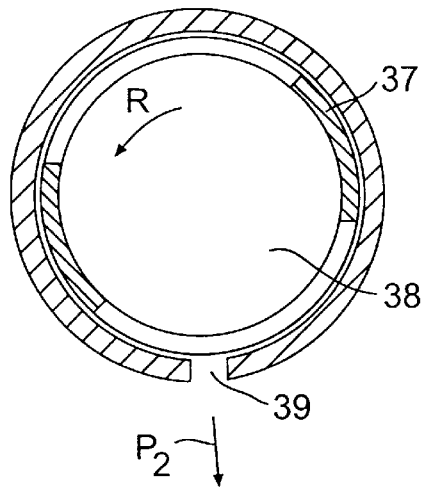

FIGS. 7a and b illustrate two embodiments of a breaker element which, like the breaker element illustrated in FIG. 6, is rotatably mounted around a rotation axis which is perpendicular to the nozzle's outlet direction $P_2$, and where the breaker element is arranged inside the pressure chamber. FIGS. 7a and b is a cross section in a plane made through the nozzle's outlet direction $P_2$, illustrating the principle of how the jet is interrupted. FIG. 7a illustrates a breaker element in the form of a star-shaped wheel 28 with four wings 30, arranged inside a pressure chamber 29. When the wheel 28 is rotated in a direction indicated by the arrow R the wings 30 will periodically close the nozzle 31, thus producing a periodic injection. FIG. 7b illustrates a similar principle where a pipe 37 is located in a pressure chamber 38 with a nozzle 39. Along a part of the pipe's circumference, in a plane made through the nozzle's 39 outlet direction $P_2$, a slit is cut which, during rotation of the pipe as indicated by the arrow R, is brought into periodic correspondence with the nozzle. The remaining sections 37 of the pipe act as breaker elements for the nozzle 39.

FIG. 8 illustrates a design where a breaker element in the form of a shaft 32 with a diametrical opening 33 is arranged in a housing 34. Here the housing 34 is located on the bottom of a pressure chamber 35, with the result that when the shaft 32 is rotated in a direction indicated by the arrow R, the opening 33 will periodically open to permit passage of a flow of liquid manure from the pressure chamber 35 to a nozzle 36 provided on the bottom of the housing 34.

The principle designs illustrated in FIGS. 7a, 7b and 8 can be given a number of constructional designs with regard to mounting of the breaker element, sealings and generation of the rotation. A particularly advantageous design is obtained when several nozzles are connected to the same pressure chamber, so that the same breaker element is used to interrupt the injection jet to several nozzles. In this case the breaker operations can be slightly phase shifted in relation to one another in order to minimize pressure surges in the pressure chamber. An example of such a design is to let the pressure chamber consist of an external pipe arranged horizontally across the tractor's direction of movement, with a row of nozzles arranged in the bottom of the pipe. The breaker element may consist of an internally rotating pipe or shaft with suitable cut-outs or openings for the production of the periodic injection.

The device according to the invention can also be used for injection of liquid mineral fertilizer, such as ammonia.

The invention has been explained above with reference to several embodiments. It is clear, however, that several variations will be able to be designed by a person skilled in the art without deviating from the scope of the invention as it is defined in the claims.

What is claimed is:

1. A device adapted to be supplied with pressurized liquid manure for periodic injection of a concentrated jet of liquid manure into a soil, the device comprising means defining a chamber to receive the pressurized liquid manure, nozzle means defining at least one nozzle opening for discharging the concentrated jet of pressurized liquid manure in a direction from the chamber to the soil, and a breaker element rotatably mounted about a rotation axis for continuous movement relative to the nozzle means to cause periodic interruption of the jet of pressurized liquid manure into the soil at intervals depending on speed of rotation of the breaker element.

2. A device according to claim 1, wherein the rotation axis is parallel with the direction of the concentrated jet of pressurized liquid manure and is located to one side of the at least one nozzle opening.

3. A device adapted to be supplied with pressurized liquid manure for periodic injection of a concentrated jet of the liquid manure into a soil, the device comprising means defining a chamber to receive the pressurized liquid manure, nozzle means defining at least one nozzle opening for discharging the concentrated jet of pressurized liquid manure in a direction from the chamber to the soil, and a breaker element, the breaker element being rotatably mounted about a rotation axis for continuous movement relative to the nozzle means to cause periodic interruption of the jet of pressurized liquid manure into the soil at intervals depending on speed of relative rotation of the nozzle means and the breaker element, wherein the breaker element comprises a rectangular plate or a cross.

4. A device according to claim 3, wherein the rotation axis is parallel with the direction of the concentrated jet of pressurized liquid manure and is located to one side of the at least one nozzle opening.

5. A device adapted to be supplied with pressurized liquid manure for periodic injection of a concentrated jet of the liquid manure into a soil, the device comprising means defining a chamber to receive the pressurized liquid manure, nozzle means defining at least one nozzle opening for discharging the concentrated jet of pressurized liquid manure in a direction from the chamber to the soil, and a breaker element, the breaker element being rotatably mounted about a rotation axis for continuous movement relative to the nozzle means to cause periodic interruption of the jet of pressurized liquid manure into the soil at intervals depending on speed of relative rotation of the nozzle means and the breaker element, wherein the breaker element comprises a disc having openings arranged to periodically align with the at least one nozzle opening during rotation.

6. A device according to claim 5, wherein the rotation axis is parallel with the direction of the concentrated jet of pressurized liquid manure and is located to one side of the at least one nozzle opening.

7. A device adapted to be supplied with pressurized liquid manure for periodic injection of a concentrated jet of the liquid manure into a soil, the device comprising means defining a chamber to receive the pressurized liquid manure, nozzle means defining at least one nozzle opening for discharging the concentrated jet of pressurized liquid manure in a direction from the chamber to the soil, and a breaker element, the breaker element being rotatably mounted about a rotation axis for continuous movement relative to the nozzle means to cause periodic interruption of the jet of pressurized liquid manure into the soil at intervals depending on speed of relative rotation of the nozzle means and the breaker element, wherein the rotation axis is perpendicular to the direction of the concentrated jet of pressurized liquid manure, and the breaker element has at least one radially oriented opening that can be brought into alignment with the at least one nozzle opening during rotation.

8. A device adapted to be supplied with pressurized liquid manure for periodic injection of a concentrated jet of the liquid manure into a soil, the device comprising means defining a chamber to receive the pressurized liquid manure, nozzle means defining at least one nozzle opening for discharging the concentrated jet of pressurized liquid manure in a direction from the chamber to the soil, and a breaker element rotatably mounted about a rotation axis for continuous movement relative to the breaker element to cause periodic interruption of the jet of pressurized liquid manure into the soil at intervals depending on speed of rotation of the breaker element, wherein the chamber is defined by a tubular shaft having a downwardly directed nozzle and wherein the breaker element is in the form of one or more wheels having several radially oriented openings arranged for continuous rotation about the rotation axis, the radially oriented openings being successively aligned with the downwardly directed nozzle upon rotation of the breaker element.

9. A device adapted to be supplied with pressurized liquid manure for periodic injection of a concentrated jet of the liquid manure into a soil, the device comprising means defining a chamber to receive the pressurized liquid manure, nozzle means defining at least one nozzle opening for discharging the concentrated jet of pressurized liquid manure in a direction from the chamber to the soil, and a breaker element, the breaker element being rotatably mounted about a rotation axis for continuous movement relative to the nozzle means to cause periodic interruption of the jet of pressurized liquid manure into the soil at intervals depending on speed of relative rotation of the nozzle means and the breaker element, wherein the rotation axis is perpendicular to the direction of the concentrated jet of pressurized liquid manure, and the breaker element has at least one radially oriented opening that can be brought into alignment with the at least one nozzle opening during rotation, wherein the breaker element comprises a rotating pipe having openings arranged inside said chamber, thereby to enable the liquid manure to be supplied through the rotating pipe and injected each time an opening in the rotating pipe aligns with the at least one nozzle opening in the chamber.

\* \* \* \* \*